United States Patent [19]
Roberts

[11] 3,865,473
[45] Feb. 11, 1975

[54] SPECTACLE ATTACHMENT

[76] Inventor: Carolyn G. Roberts, 2275 E. Bay Dr., Apt. 102, Clearwater, Fla. 33516

[22] Filed: Aug. 28, 1973

[21] Appl. No.: 392,272

[52] U.S. Cl. .............................................. 351/113
[51] Int. Cl. .............................................. G02c 5/16
[58] Field of Search ...................... 351/113, 123, 51

[56] References Cited
UNITED STATES PATENTS

| 2,684,014 | 7/1954  | Fairly  | 351/113 |
| 2,789,381 | 4/1957  | Belgard | 351/51  |
| 3,156,757 | 11/1964 | Spina   | 351/113 |
| 3,619,043 | 11/1971 | Carlyle | 351/113 |

FOREIGN PATENTS OR APPLICATIONS

| 781,167   | 3/1968 | Canada        | 351/113 |
| 1,039,279 | 8/1966 | Great Britain | 351/113 |

Primary Examiner—Paul A. Sacher
Attorney, Agent, or Firm—Marden S. Gordon

[57] ABSTRACT

An attachment intended to be applied to conventional type spectacles having a lens holding frame with a pair of temples pivotally connected to opposite ends thereof by temple hinge members, the attachment being in the form of a resilient material adapted to be secured to the hinged end of the temple in a position to engage the interior temporal end portion of the frame upon the temple being pivoted into a normal head engaging position compressing the attachment therebetween with the same thus exerting an inwardly directed force about the hinge member against the hinged end of the temple in a manner urgingly biasing the temple into firm engagement with the head of the wearer to retain the spectacles firmly in place on the wearer's head.

2 Claims, 6 Drawing Figures

PATENTED FEB 11 1975 3,865,473
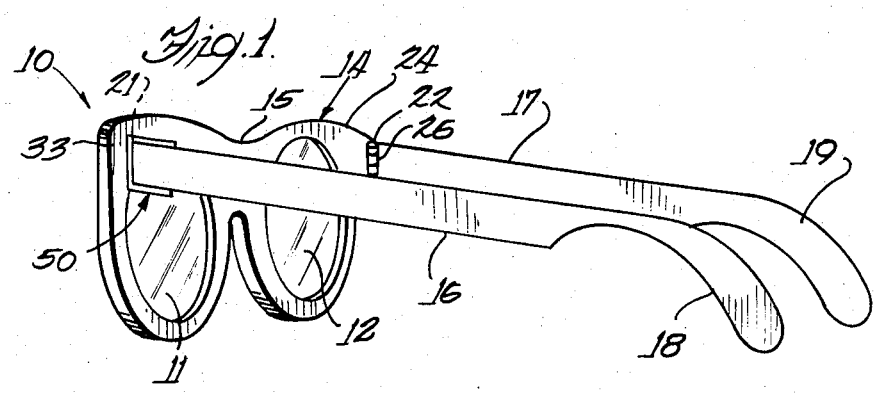
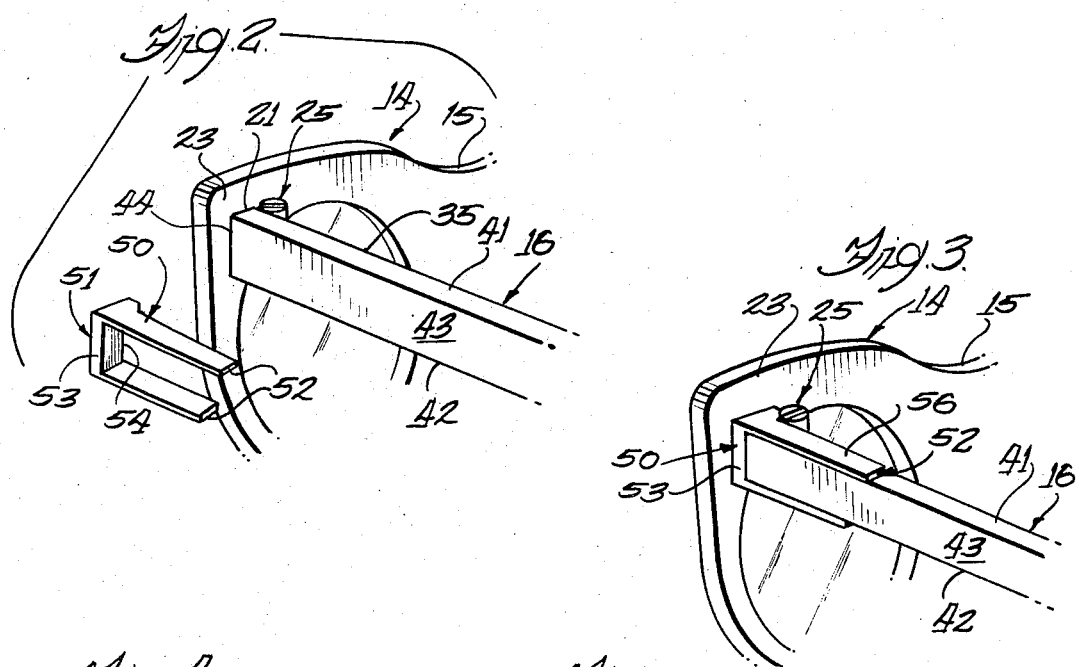
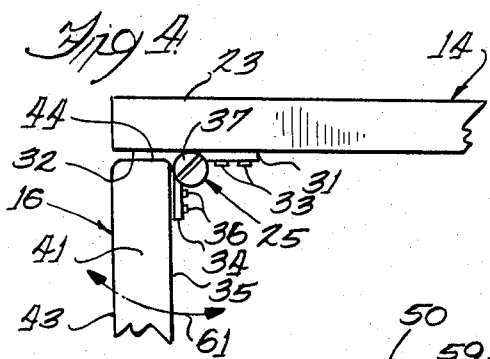
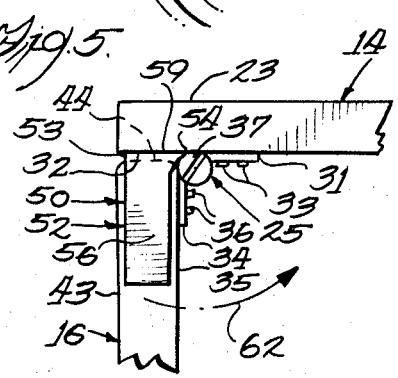
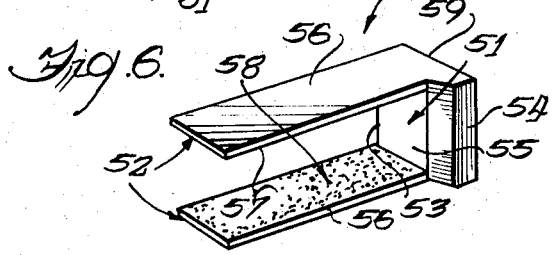

SPECTACLE ATTACHMENT

BACKGROUND OF THE INVENTION

1. Field of the Invention

This invention relates generally to spectacles and more particularly to a novel attachment for spectacles intended to eliminate the nuisance of loose fitting spectacle temples and thus assist in retaining the spectacles firmly in place when on the head of a wearer.

2. Description of the Prior Art

There is presently known in the prior art spectacles of various configurations, designs and materials each adapted in one way or another to position a pair of lens in the line of vision of a wearer to assist the eyesight of the wearer. As the heads of individuals are of various shapes and configurations, it is required that the spectacles be selectively chosen by the individual to assure comfort and firm fit as to the proper positioning of the lens in front of an individual's eyes.

As is well known in the art, such fitting of the spectacles is normally achieved by the individual trying on numerous frames for comfort and fit, and after the desired frame is located, the prescription lens are inserted thereinto and the frame adjusted to the fit of the individual wearer's head by the normal process of bending the temples of the spectacles until a firm but comfortable fit is obtained against the side of the individual wearer's head with the outer bows normally provided on each temple resting about the individual's ears so that the spectacles are firmly in place on the wearer's head.

While such fit is normally suitable for the initial period of time that the spectacles are worn, eventually the temples lose some of their resiliency or some of their adjustment requiring that the individual either attempt to rebend the temples to achieve the firm spectacle fit, or alternatively, that the individual return to the optometrist to have the spectacles adjusted. In view of the expense of constantly returning to the optometrist for adjustment, most individuals take it upon themselves to attempt to rebend or readjust the temples, this eventually weakening the temples until it is no longer possible to retain a firm fit of the spectacles on the wearer's head. Thus, while the spectacles may not be held firmly in place, most individuals will still utilize such spectacles rather than incur the expense of having to obtain new spectacle frames or of having the temples treated when possible and readjusted, this again involving an additional expense. The individual is thus left with the nuisance of loose fitting spectacles which may be easily knocked off or may easily fall off.

It would thus be desirable to provide some means by which a normal individual could retain a firm fit of the spectacles without the expense of constantly revisiting an optometrist for the required readjustments, and without having to encounter the difficulty of attempting to continuously rebend and readjust the temple with the associated risk of weakening or breaking the temple thus necessitating the purchase of a complete new set of spectacles.

SUMMARY OF THE INVENTION

The present invention recognizes the aforementioned problems and difficulties encountered by individuals wearing spectacles as to keeping the spectacles firmly in place, with the present invention providing a novel solution thereto in the form of a universal attachment intended for mounting on conventional type spectacles and which will retain the temples firmly urged against an individual wearer's head thus overcoming and eliminating the nuisance of loose fitting spectacle frames.

It is a feature of the present invention to provide a spectacle attachment adapted for mounting on spectacles without requiring any special tools, expertise, or the like on the part of the individual and which will urge the spectacles in an inward direction against the wearer's head to retain the same firmly positioned thereon.

A further feature of the present invention resides in an attachment for spectacles which is substantially universal in nature and adapted to be mounted on nearly all brands of spectacles by various manufacturers in a manner to retain the temples firmly urged against the wearer's head without the wearer having to rebend or adjust any portion of the spectacle frame thus eliminating the possibility of weakening or breaking the spectacle frame during such readjustment.

Yet still a further feature of the present invention provides an inexpensive attachment for spectacles to retain the temples firmly urged against a wearer's head and wherein such attachment is adapted for mounting on either the left or right hinged end of the temple such that it is not necessary to provide a special attachment for the left and right temples as the single attachment is universally applicable to either temple without the individual installing the attachment having to concern himself that the correct attachment has been installed on the correct temple.

The provision of a spectacle attachment such as briefly outlined above, and possessing the stated advantages, constitutes the principal features of the present invention. The provision of a spectacle attachment which is relatively simple in its construction and which therefore may be readily manufactured at a relatively low cost and by simple manufacturing methods; one which may be manufactured out of readily available materials; one which is devoid of moving parts and which therefore is unlikely to get out of order; one which is rugged and durable and which therefore may be guaranteed by the manufacturer to withstand many years of usage; one which is aesthetically pleasing and refined in appearance so as to not detract from the appearance of the spectacle frames or to be adversely noticeable thereon; one which may be installed as part of the original spectacle frames, or which may be attached to the spectacles later as an accessory item which is readily attached by individuals without requiring special tools or special expertise; and one which, otherwise, is well adapted to perform the services required of it, are further desirable features which have been borne in mind in the production and development of the present invention.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of a pair of spectacles having a preferred form of an attachment constructed

3 in accordance with the present invention installed thereon;

FIG. 2 is an enlarged fragmentary perspective view of a temple hinge portion of a pair of spectacles showing the attachment constructed in accordance with the present invention exploded outwardly from its intended mounted position on the hinged end of the temple;

FIG. 3 is a fragmentary perspective view similar to FIG. 2 and showing the attachment secured to the hinged end of the temple;

FIG. 4 is an enlarged fragmentary top plan view of the spectacles of FIG. 2 without the attachment in position;

FIG. 5 is an enlarged fragmentary top plan view of the spectacle of FIG. 3 having the attachment secured in position thereon; and FIG. 6 is a perspective view of the attachment constructed in accordance with the present invention.

DESCRIPTION OF THE PREFERRED EMBODIMENT

Referring now to the drawings it is to be noted that the present invention is adapted to be incorporated in a pair of conventional type spectacles of the type indicated generally by the reference numeral 10 which comprises a pair of transparent lenses 11 and 12 which are secured in a lens holding frame 14 which includes a nasal bridge portion 15. A pair of individual temples 16 and 17 are each provided with an ear engaging bow 18 and 19 respectively at their outer ends with their inner ends 21 and 22 respectively each being pivotally mounted on their respective temporal end portions 23 and 24 of the lens holding frame 14 by means of temple hinges 25 and 26 respectively.

As each half of the spectacles 10 is identical as to its respective portion of the frame 14, associated temples 16 and 17, and associated hinge members 25 and 26, the remaining portion of this description will direct itself for explanatory purposes to the portion of the spectacles involving temple 16, hinge 25 and temporal end 23, it being understood that the temple 17, temple hinge 26, and temporal end 24 are identical.

The hinge 25 is composed of two parts, namely a stationary hinge part 31 which is anchored in any preferred manner to the interior surface 32 of temporal end 23, such as by screws or rivets 33, and a movable hinge part 34 which is anchored in any preferred manner on the interior surface 35 of the butt end portion of the temple 16, such as by screws or rivets 36. The hinge parts 31 and 34 are pivotally united together by a hinge screw or pin 37 secured therein in a conventional manner.

The temple 16 includes the outer bowed end 18, top and bottom edges 41 and 42, the interior surface 35, and exterior surface 43, and the butt end 44.

As seen in FIG. 4, conventional spectacles 10 in the normal head engaging position are designed such that when the temple 16 projects normal to the plane of the lens holding frame 14, then the butt end 44 is spaced outwardly a slight distance from the interior temporal end 32 in order to permit the spectacles slight pivotal freedom about pivot pin 37 in the placing and removing of the spectacles from a wearer's head. Due to the difference in materials utilized in the manufacturing of spectacles, and in order to avoid having to make the spectacles to close tolerances as pertains to the mounting of the temples on the lens holding frame, it has been found in the industry not to be desirable to mount the temple where the butt end would engage with the interior temporal end of the lens holding frame due to potential damage to the frame, and particularly due to the requirement that should mounting be desired it would then require the industry to maintain a high level of tolerance and quality control with the butt end of each temple being accurately machine formed to permit freedom in pivoting about the pivot point while still permitting engagement with the interior temporal end. For these reasons, among others, the manufacturers of spectacle frames have standarized upon the construction wherein the butt end of the temples is positioned a slight distance from the adjacent temporal interior end of the lens holding frame with the final adjustment of the spectacles to an individual wearer's head being left to the optometrist who, by bending or otherwise distorting the temples conforms the same to the head of the wearer.

Referring now to FIG. 6 there is illustrated an attachment constructed in accordance with the present invention and designated in its entirety by the reference numeral 50 and is in the form of a general U-shaped member comprising a base member 51 and leg members 52 depending outwardly from the peripheral side edges of the base member. The attachment 50 is manufactured out of resilient material, such as rubber, plastic, or any other suitable satisfactory resilient material, with a preferred embodiment being the utilization of silicone rubber due to its excellent resiliency characteristics.

The base member 51 may be substantially flat or, as shown in this preferred embodiment, in the form of a wedge like member extending transversely of the legs 52 and having a maximum thickness at end 53 with a minimum thickness at end 54. The pair of legs 52 are each of a flat longitudinally extending elongated member having an exterior surface 56 and an interior surface 57, the legs extending substantially parallel to each other and in alignment with each other. Disposed along the interior surface 57 of each of the legs 52 is a layer of contact type adhesive 58 adapted to be used in the securing of the attachment 50 to the spectacles 10.

In the attaching of the attachment 50 to temple 16, the temple is pivoted away from its normally open head engaging position permitting the attachment 50 to be aligned with the butt end 44 thereof and inserted in a telescopic manner thereover such that legs 52 extend along respective top and bottom edges 41 and 42 of the temple in juxtaposition therewith and with the interior surface 55 of the base member 51 disposed adjacent butt end 44 of the temple 16, the spacing between the legs 52 being approximately equal to the height of the temple 16 with the adhesive 58 on the legs contacting the temple top and bottom edges and securing the attachment thereto such that the attachment is movable with the temple 16. When the attachment 50 is secured to the temple 16, it is oriented with the thickest end 53 of the base member adjacent the exterior surface 43 of the temple with the minimum thickness end 54 of the base member disposed adjacent the hinge 25 with the same possibly being in contact therewith.

It is to be understood that the attachment 50 is trimmable along its end and edges by any suitable cutting instrument, such as a knife, scissors and the like should the width of the legs 52 or of the base member 51 be greater than the thickness of the temple 16 on which it is to be attached so that the same is custom fitted by the individual user if so desired. Still further, while the attachment 50 may be supplied in a variety of colors so as to blend in with the color of the spectacles 10, a preferred embodiment would provide the attachment in a somewhat transparent material to afford a greater degree of adaptability to accomodate various spectacle colors.

It is now apparent that when the temple 16 is pivoted on hinge 25 to the normal outwardly projecting head engaging position, such as in the directions indicated by arrow 61 in FIG. 4, that the base member 51 will be compressingly engaged between the butt end 44 and the interior temporal end 32 in a manner to exert a force against the butt end to urgingly bias the temple 16 in the direction of arrow 62 of FIG. 5 to firmly engage with the head of the wearer to retain the spectacles firmly in position on the wearer's head.

In order to accomodate for different normally encountered spacings between butt end 44 and temporal interior end 32, it is to be understood that the attachment 50 may be supplied in a variety of base member 51 thicknesses, with this providing the further advantage that as the spectacles grow older and require further adjustment, it is only required that the attachment 50 as applied to the spectacles be removed and a new attachment substituted therefor having a thicker base member in order to exert a greater inward force on the temples without ever having to bend or otherwise distort the temples to obtain a firm fit of the spectacles on the head of the wearer.

Further, it is to be understood that the attachment 50 is readily mountable on either the left hand temple 16 or on the right hand temple 17 with the only requirement being that the attachment be oriented before application such that the thinnest end 54 is nearest the temple hinge with the thickest end 54 being furthest from the temple hinge such that it is not necessary to manufacture both a left and right handed attachment as a single attachment is universally adaptable for mounting on both the left and right hand butt ends of the temples.

The present invention thus provides a novel economical inexpensively produced attachment for spectacles to retain the temples in firm engagement with a wearer's head without having to deform or otherwise bend the temples such that a novel solution eliminating the nuisance of loose fitting spectacles is provided.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A spectacle attachment intended to be attached to conventional spectacles having a lens holding frame and a pair of temples each connected at their butt ends to an associated temporal end portion of the frame by a temple hinge, the hinged butt end of each temple disposed in close juxtaposition with the adjacent interior temporal end portion of the frame when the temples are in head engaging position extending substantially normal to the plane of the frame, each temple having a hinged end, an outer end, top and bottom edges, and interior and exterior surfaces, the spectacle attachment comprising:

a body member having a U-shape configuration and manufactured of a resilient transparent silicone rubber material, the body member including a base member with a pair of integrally formed parallelly disposed outwardly depending spaced apart leg members;

said base member being in the form of a wedge extending transverse to the leg members and tapering from a maximum thickness adapted to be positioned on the end of the butt hinged end of the temple furthest from the temple hinge and nearest the exterior surface of the temple, the wedge tapering to a minimum thickness adapted to be positioned on the butt hinged end of the associated temple adjacent the temple hinge;

said leg members each being of an identical size and configuration being in the form of flat elongated rectangular configurations each having one edge joined integrally with a peripheral side edge of the base member with each leg projecting outwardly therefrom in the same direction, the leg members spaced apart the approximate height of the associated temple and adapted to be longitudinally aligned with and secured to the hinged butt end of the temple with the interior surface of each of the leg members disposed in juxtaposition with the top and bottom edges respectively of the associated temple and with the interior surface of the base member disposed adjacent the end of the hinged butt end of the temple;

said leg members and said base member each adapted to be trimmed by the use of a knife, scissors and the like to custom fit the body member to the spectacle temple in an aesthetically pleasing manner providing a refined appearance thereto;

said base member being of a thickness adapted to be inserted intermediate the hinged butt end of each temple and the adjacent interior temporal portion of the frame to be compressingly engaged therebetween when the temples are moved into the head engaging position with the resilient material of the base member thus exerting an outwardly directed force against the temple hinged butt end in a manner urgingly biasing the temple rotatedly inwardly about the temple hinge against the head of the wearer;

a layer of pressure sensitive adhesive means disposed on each of the opposed interior confronting surfaces of each of the leg members and adapted to adhesively secure the leg members to the top and bottom edges respectively of the associated hinged butt end of the temple on which the body member is mounted, the body member once secured to the temple being movable therewith in a manner not interfering with the operation of the spectacles while yet being positioned for use each time the temples are opened from the frame in position to be placed about the head of the wearer; and whereby the spectacle attachment requires no alteration of the frame or temples when affixed thereto and operable therewith.

2. The spectacle attachment as set forth in claim 1 wherein the leg members each extend parallel to each other with each of the leg members extending normal to the plane of the base member.

* * * * *